C. F. ARNOLD.
MACHINE FOR MAKING AND APPLYING TUFTS.
APPLICATION FILED NOV. 30, 1920.
1,390,267. Patented Sept. 13, 1921.
7 SHEETS—SHEET 3.
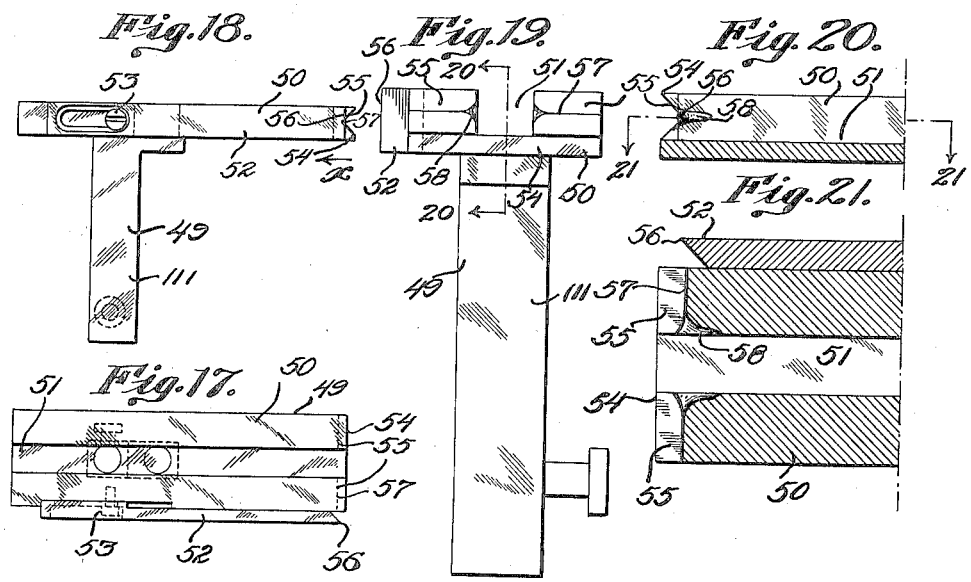
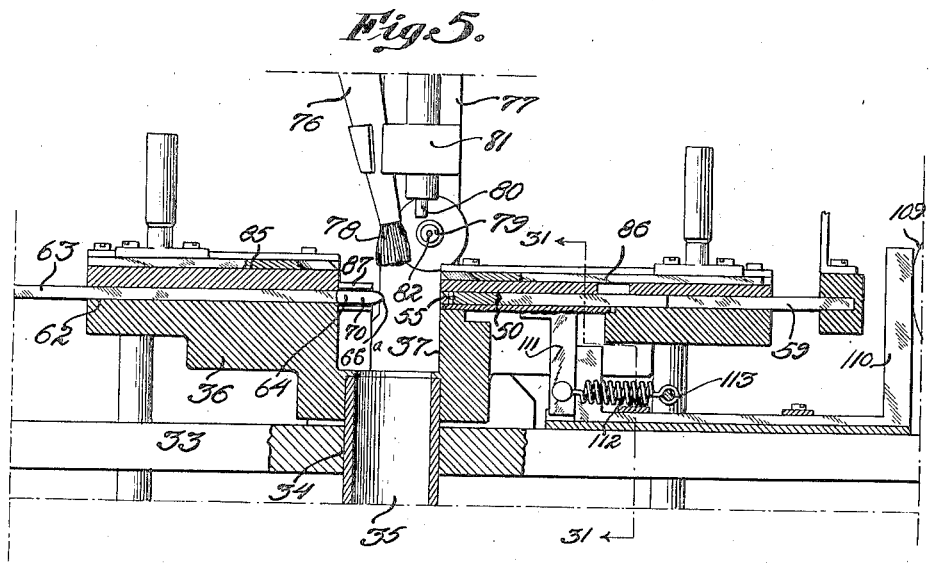
Witnesses
Geo. A. Gruss
Augustus B. Coppes
Inventor
Clarence F. Arnold
By Joshua R. H. Potts
his Attorney

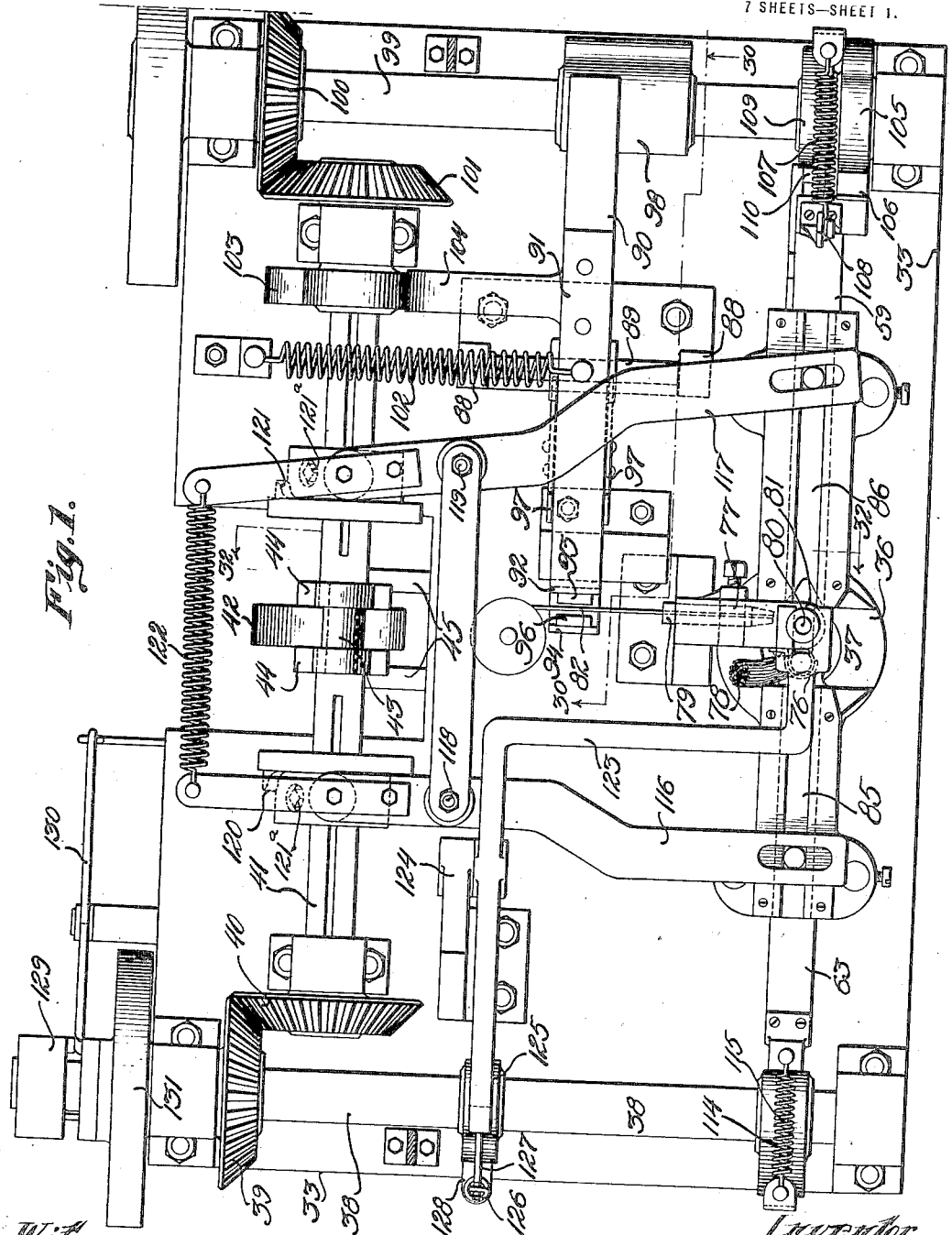

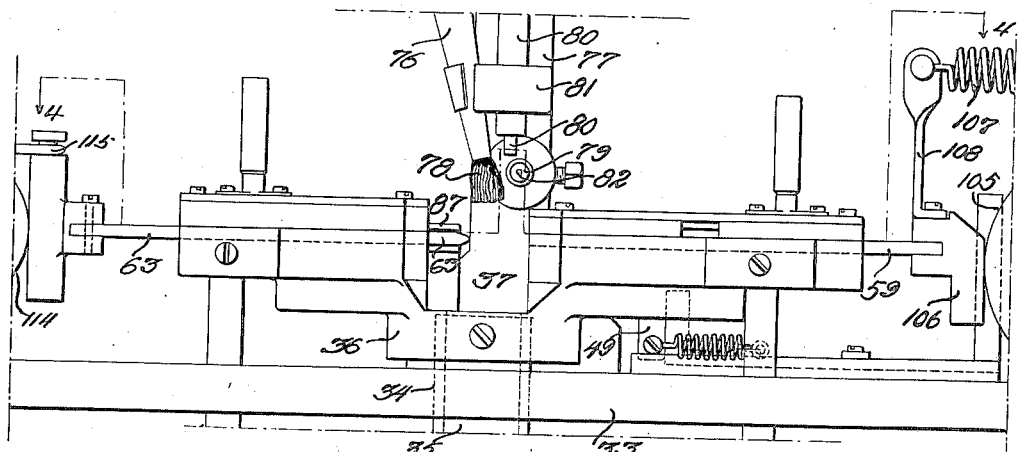
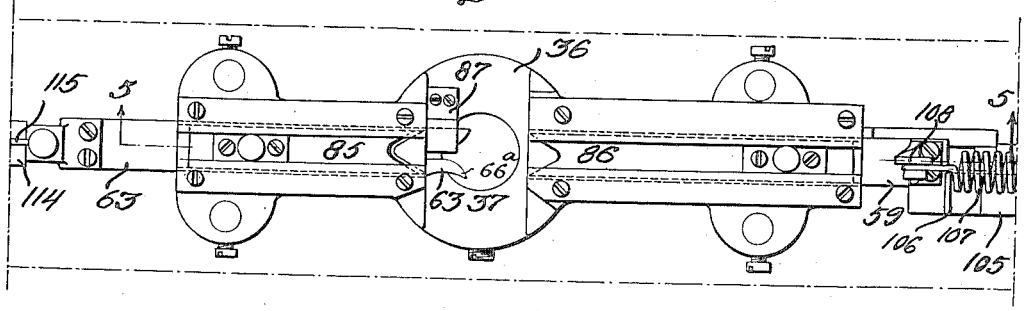
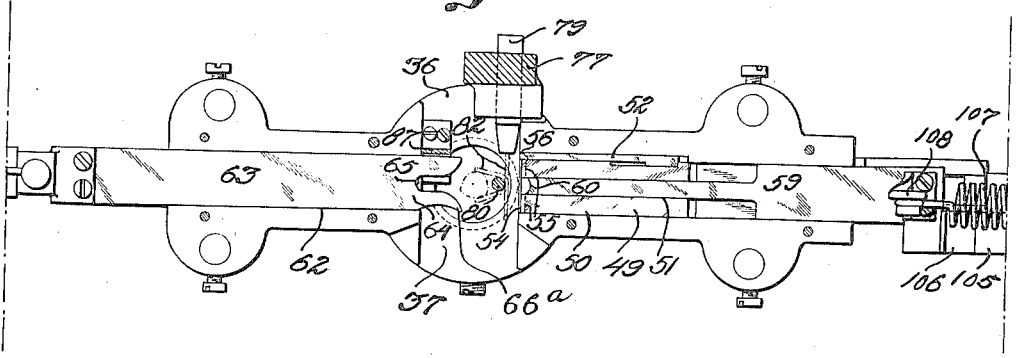

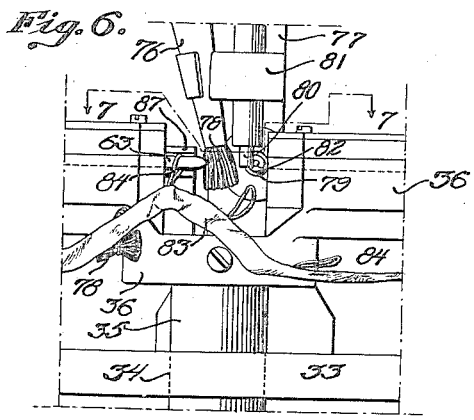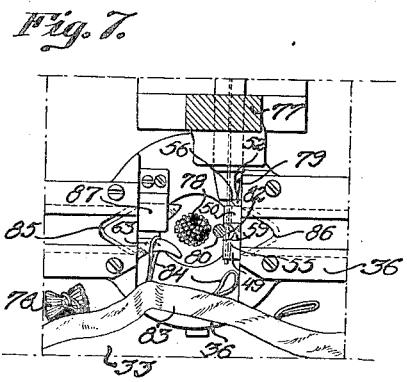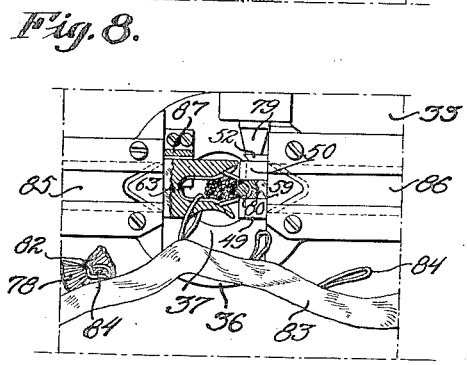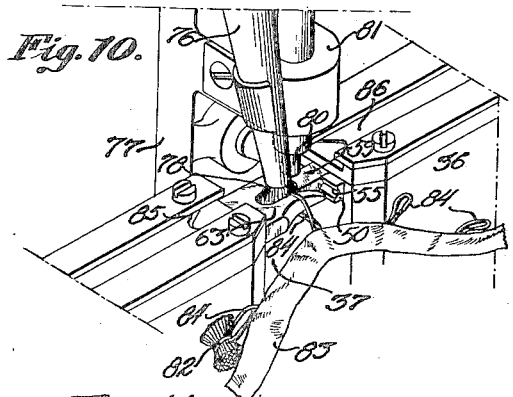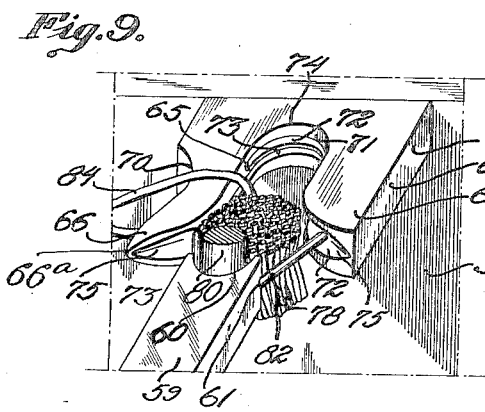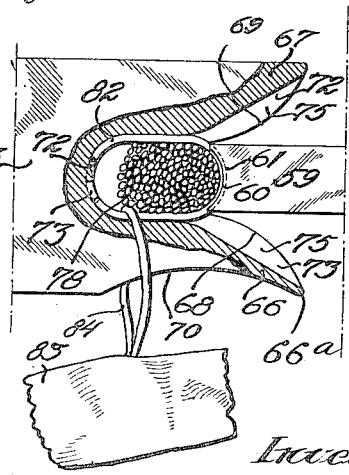

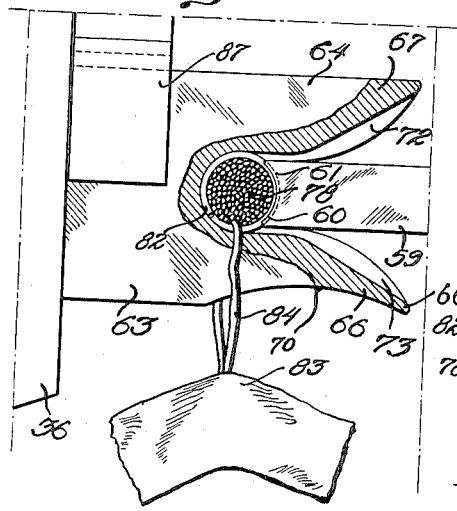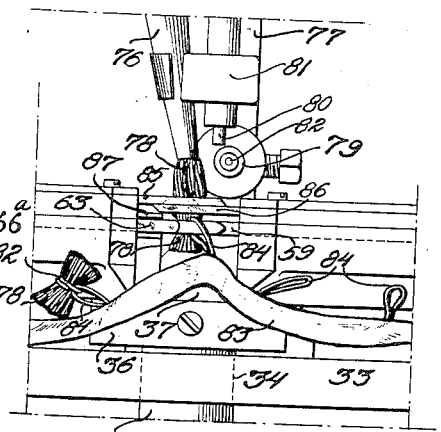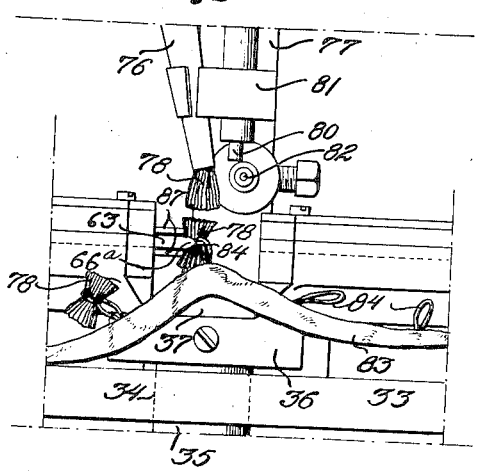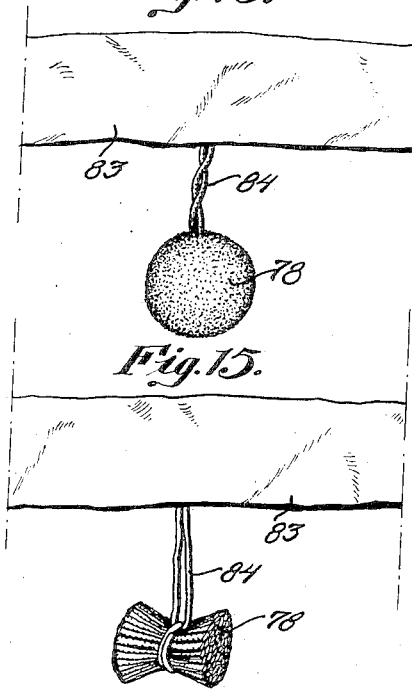

C. F. ARNOLD.
MACHINE FOR MAKING AND APPLYING TUFTS.
APPLICATION FILED NOV. 30, 1920.
1,390,267.
Patented Sept. 13, 1921.
7 SHEETS—SHEET 6.
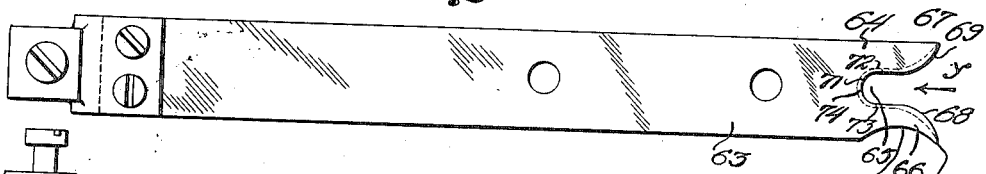
Fig. 22.
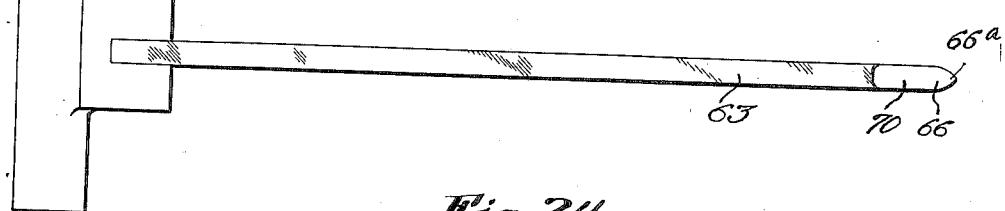
Fig. 23.
Fig. 24.
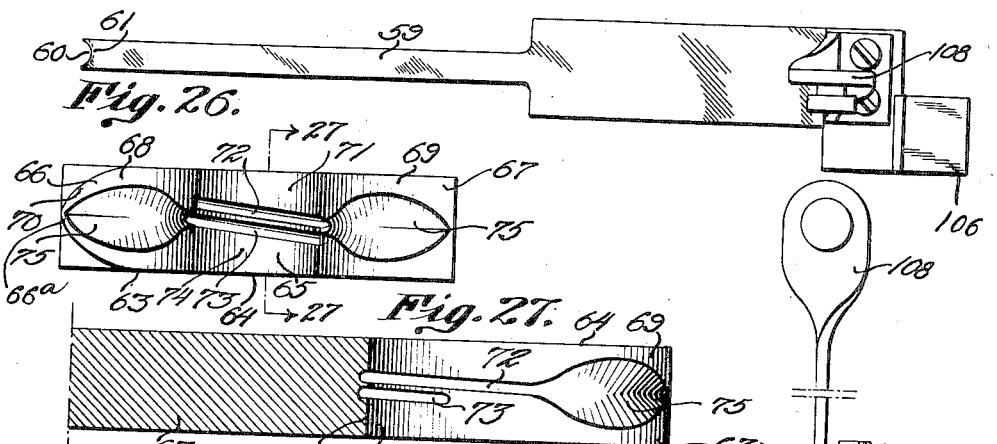
Fig. 26.
Fig. 27.
Fig. 25.
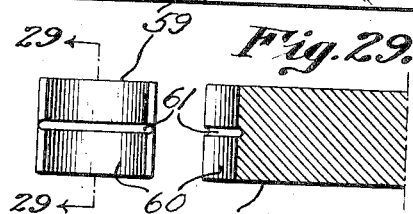
Fig. 28.
Fig. 29.
Witnesses
Geo. A. Gruss
Augustus B. Coppes
Inventor
Clarence F. Arnold
By Joshua R. H. Potts
his Attorney C. F. ARNOLD.
MACHINE FOR MAKING AND APPLYING TUFTS.
APPLICATION FILED NOV. 30, 1920.
1,390,267.
Patented Sept. 13, 1921.
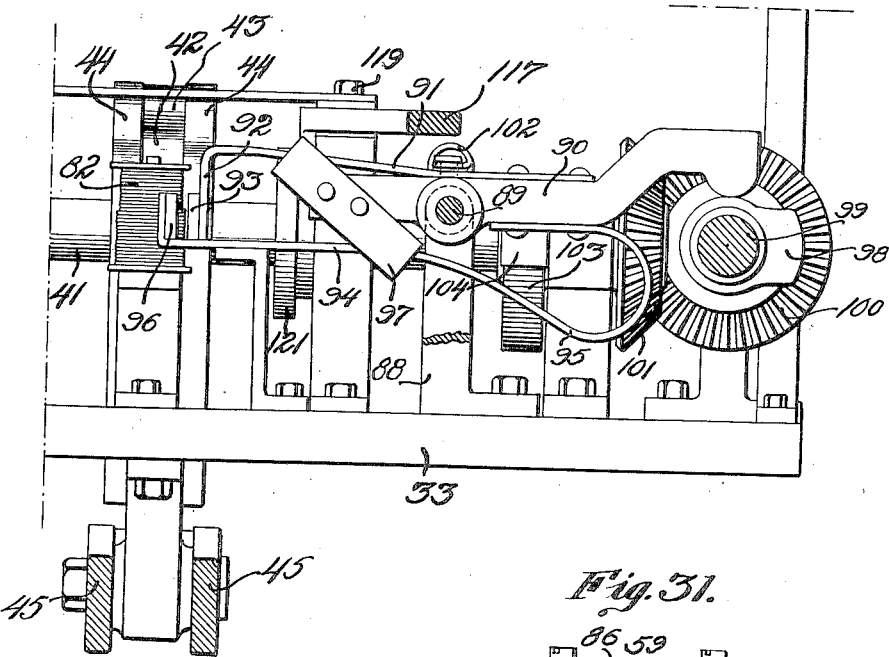
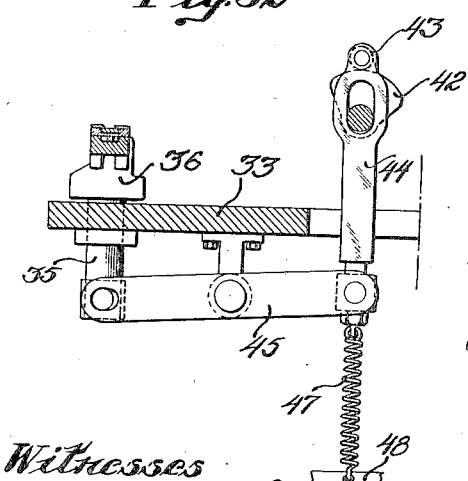
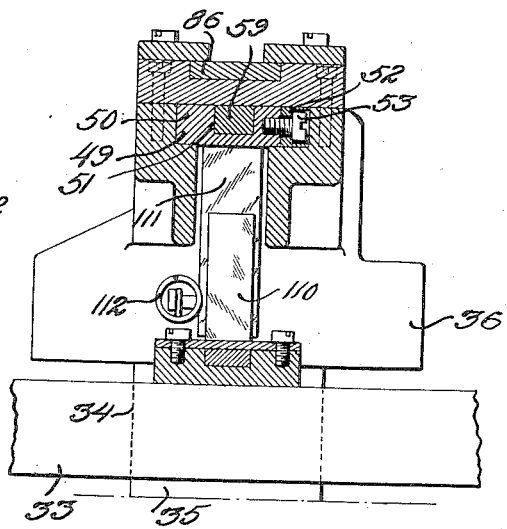
Inventor
Clarence F. Arnold
Witnesses

UNITED STATES PATENT OFFICE.

CLARENCE F. ARNOLD, OF PHILADELPHIA, PENNSYLVANIA, ASSIGNOR TO H. F. WALLISER COMPANY, OF PHILADELPHIA, PENNSYLVANIA.

MACHINE FOR MAKING AND APPLYING TUFTS.

1,390,267. Specification of Letters Patent. Patented Sept. 13, 1921.

Application filed November 30, 1920. Serial No. 427,366.

*To all whom it may concern:*

Be it known that I, CLARENCE F. ARNOLD, a citizen of the United States, residing at Philadelphia, in the county of Philadelphia and State of Pennsylvania, have invented certain new and useful Improvements in Machines for Making and Applying Tufts, of which the following is a specification.

Various forms of fringe and edgings have been manufactured which include tufts usually made in the form of balls attached to projecting loops of the fringe or edging. Prior to my present invention the manufacture of said tufts and the application thereof to the fringe or edging has been slow, tedious and expensive. The method usually followed was to make the balls by first binding a number of short strands by a loop of thread to compress the center of the strands and cause them to assume a substantially spherical shape at their outermost parts after which the tufts thus made were independently secured to the loops of the fringe or edging. In making the tufts they were usually tied with thread and each loop of the fringe was secured to the thread which bound the strands of the tuft together. This thread not only was compelled to take the tension caused by the attempt of the strands to spring apart at their center but also had to resist any pulling action to which the tufts were subjected when in use and consequently these threads often broke and the tufts came apart and became detached from the loops of the fringe.

One object of my present invention is to facilitate the making of tufts and application of said tufts to fringe, edgings or other articles.

Another object is to make said tufts far more durable than those heretofore made.

A still further object is to provide an improved machine which will automatically operate to make and apply said tufts directly to the projecting loops of fringe at the same time that the tufts are being formed.

A still further object is to so arrange the parts of my improved machine that it does not require exceptionally skilled labor to operate the same.

These objects, and other advantageous ends which will be described hereinafter, I attain in the following manner, reference being had to the accompanying drawings in which—

Figure 1 is a top plan view of a machine made in accordance with my present invention, Fig. 2 is a fragmentary front elevation of certain of the parts shown in Fig. 1, Fig. 3 is a top plan view of Fig. 2 with certain of the parts omitted for clearness of illustration, Fig. 4 is a sectional plan view taken on the line 4—4 of Fig. 2, Fig. 5 is a fragmentary sectional elevation taken on the line 5—5 of Fig. 3, Fig. 6 is a fragmentary elevation illustrating the head raised from the position illustrated in Fig. 2 and also showing a loop of a piece of fringe having been placed in position ready to have a tuft secured thereto, Fig. 7 is a sectional plan view taken on the line 7—7 of Fig. 6, Fig. 8 is a fragmentary plan view of the same general character as that shown in Fig. 7 illustrating a successive stage in the position of the parts to make and apply a tuft to said loop of the fringe, Fig. 9 is a perspective view of certain of the parts shown in the positions occupied in Fig. 8, Fig. 10 is a perspective view showing a successive stage and illustrating the parts having moved into another position from that occupied in Figs. 8 and 9, Fig. 11 is a fragmentary plan view on an enlarged scale and illustrated partly in section with the parts in the position shown in Fig. 10, Fig. 12 is a view of the same general character as that shown in Fig. 11 with the parts having moved to completely form a tuft and attach the tuft simultaneously to said loop of the fringe, Fig. 13 is a fragmentary elevation showing the completed tuft having been severed from the main group of tuft threads by the sliding action of two knife blades after the head has been moved downwardly to draw another length of the tuft threads into the position to form another tuft, Fig. 14 is a view of the same general character as that shown in Fig. 13 illustrating the slidable forked die having moved inwardly and the severed tuft stopped by projecting means so as to free the tuft from the forked die, Fig. 15 is an elevation showing a tuft formed and attached to a loop, Fig. 16 shows a view after the tuft has been steamed or otherwise treated so as to form a ball, Fig. 17 is a detail top plan view of a slidable cutting device which forms a part of my present invention, Fig. 18 is an elevation of the structure shown in Fig. 17, Fig. 19 is an enlarged end elevation looking in the direction of the arrow $x$ in Fig. 18, Fig. 20 is a fragmentary section taken on the line 20—20 of Fig. 19, Fig. 21 is a fragmentary sectional plan view taken on the line 21—21 of Fig. 20, Fig. 22 is a top plan view of a slidable forked die which forms a part of my present invention, Fig. 23 is a front elevation of the forked die shown in Fig. 22, Fig. 24 is a top plan view of a plunger die which forms a part of my present invention, Fig. 25 is a side elevation of the die shown in Fig. 24, Fig. 26 is an enlarged end elevation looking in the direction of the arrow $y$ in Fig. 22 and illustrating one of the important features of my invention, Fig. 27 is a fragmentary section taken on the line 27—27 of Fig. 26, Fig. 28 is an enlarged end elevation of the grooved end of the plunger die shown in Figs. 24 and 25, Fig. 29 is a fragmentary section taken on the line 29—29 of Fig. 28, Fig. 30 is a fragmentary section taken on the line 30—30 of Fig. 1, Fig. 31 is a fragmentary transverse sectional elevation taken on the line 31—31 of Fig. 5, and Fig. 32 is a section taken on the line 32—32 of Fig. 1 drawn on a smaller scale and with certain of the parts omitted.

In carrying out my invention instead of using fibrous thread as a binding agent for the tuft strands in the usual manner, I employ wire of a fine gage for said purpose.

Referring to the drawings, 33 represents a frame or supporting structure having a hole 34 in its top through which is adapted to slide in an upward and downward direction a hollow post 35. A head 36 is secured to the top of the post 35 above the frame 33; said head including a cavity 37 which is directly above the space within the post 35 as clearly shown in Fig. 5. The post 35 at predetermined times during the operation of the machine receives an upward and downward movement, to raise and lower the head 36, by the following mechanism.

A main drive shaft 38, as shown in Fig. 1, has a bevel gear 39 thereon which meshes with another bevel gear 40 on a shaft 41. This shaft 41 has a cam 42 thereon which operates upon a pin 43 on a member 44 as shown in Fig. 32. The member 44 is connected to one end of a pivotally mounted beam 45; the other end of said beam being secured to the bottom of the post 35. A spring 47 is secured to the beam 45 and to a part 48 of the frame. Thus during the rotation of the shaft 41, the cam 42 serves to move the post 35 downwardly and the spring 47 coacts with the cam 42 to move the post 35 upwardly.

The head 36 at one side of the cavity 37 forms a slidable bearing for a device 49 as shown in detail in Figs. 17 to 21 inclusive, said device including an elongated member 50 having a central channel 51 therein and a wire cutting blade 52 which is adjustably secured to one side thereof by a screw 53. The end 54 of the member 50 has a transversely extending V-shape groove 55; said V-shape groove, as shown in Figs. 17, 19 and 21 being interrupted within its length due to the provision of the channel 51. The cutting edge 56 of the wire cutting blade 52 projects slightly beyond the innermost portion 57 of the groove 55 as clearly shown in Figs. 17, 18, 20 and 21. Furthermore the member 50 is preferably notched out as shown at 58 to form recesses which merge into the space provided by the groove 55; said recesses 58 being present for a purpose hereinafter obvious. A plunger die 59, as shown in detail in Figs. 24 and 25, is adapted to slidably fit within the channel 51 and this plunger die has a concaved end 60 which is grooved as shown at 61 in Figs. 24, 25, 28 and 29; said groove 61 following the concavity of said end of the plunger die.

The head 36 at the opposite side of the cavity 37 has a guideway 62 in which is adapted to slide a forked die 63; said forked die being shown in detail in Figs. 22, 23, 26 and 27. This forked die is on substantially the same level as the device 49 and under certain conditions hereinafter described, the device 49 and forked die 63 move outwardly and inwardly with respect to the cavity 37 and the plunger die co-acts relatively thereto to perform the operation of the machine, namely to make a tuft and apply it to a loop of fringe or edging.

The end 64 of the forked die includes a notch or indentation 65 which divides said end portion 64 so as to form two prongs or furcations 66 and 67; the prong 66 tapering to a smooth point 66$^a$. This notch 65 flares outwardly so that the prongs 66 and 67 have convex surfaces 68 and 69 and the prong 66 is shaped inwardly as shown at 70. The inner wall or surface 71 forming the notch 65 has two grooves 72 and 73. These grooves at the inner concaved part 74 of the notch 65 are arranged close to each other but at different levels; the groove 72 being continued substantially throughout the length of the prong 67 and the groove 73 being continued substantially throughout the length of the prong 66. It will be noted that as shown in Figs. 26 and 27 that the innermost parts of the grooves 72 and 73 slant and that the outer ends of the grooves are widened as shown at 75. Thus both of the grooves have their outer ends at substantially the same level and extend inwardly one slanting upwardly while the other slants downwardly; each of the grooves passing entirely around the concaved inner portion 74 and terminating in the prong opposite that in which its forward front end is formed.

A feed tube 76 is supported on a standard 77; said feed tube serving to hold in group form the tuft threads 78 with the lower ends of said tuft threads bunched and positioned over the cavity 37 as clearly shown in Fig. 5. A wire feeding tube 79 occupies a substantially horizontal position and is adapted to feed lengths of wire intermittently in line with the groove 55 of the member 50. A mandrel pin 80 is slidably mounted in a bearing 81 supported on the standard 77 and said mandrel pin is movable upwardly and downwardly; the downward movement occurring when a length of the wire 82 from the tube 79 is moved outwardly when the head 36 is in its raised position; such position being shown in Fig. 6; it being noted that the mandrel pin 80 in said Fig. 6 is positioned between the wire 82 and the bunch of tuft threads 78 which projects beyond the bottom of the feed tube 76.

A fringe or edging 83 is illustrated and may be of any form having loops 84. These loops are adapted to be hooked by an operator over the prong 66 of the slidable forked die 63 as shown in Fig. 6 and in the operation of the machine, the device 49 moves outwardly so that the projected length of wire 82 will be positioned within the groove 55; the end 60 of the plunger die 59 also moving outwardly a short distance to press the length of wire up against the mandrel pin 80 while the device 49 advances farther into the cavity 37 to cause the cutting blade 52 to sever the wire at the end of the wire feed tube 79; said end of the wire feed tube being preferably hardened and co-acting with the blade 52 to cause the wire to receive a clean cut. The device 49 then continues in its outward movement to bend the severed length of wire partway around the mandrel pin so that the end portions of the wire embrace the bunch of tuft threads 78. At the same time the forked die 63 moves outwardly and the ends of the severed wire engage the widened parts 75 of the grooves 72 and 73 and the tuft threads 78 will be confined between the wire, the mandrel pin, and the prongs of the forked die, as shown in Figs. 8 and 9; said plunger die having advanced from the position shown in Fig. 7 after the first bending of the wire so as to cause the wire between it and the mandrel pin to position itself within the groove 61 and thereby firmly hold the looped end of the wire, after which the mandrel pin is raised. The plunger die 59 then presses against the wire and the forked die 63 moves relatively thereto to cause the ends of the severed wire to ride into the innermost parts of the grooves 72 and 73 and in so doing one of the end portions of the wire will be projected through the loop 84 of the fringe 83 and when said end portions of the wire move in opposite directions at the innermost part 74 of the notch 65, they will follow the inclined parts of the grooves 72 and 73 and thereby be wrapped around the bunch of tuft threads so as to compress and securely bind said tuft threads as is clearly obvious from the positions shown in Fig. 12. The timing of the parts is such that after the binding action as shown in Fig. 12, the entire head 36 is lowered so as to pull an additional length of the tuft threads through the feed tube 76, after which two knives 85 and 86, which are slidably mounted in the head 36 at opposite sides of the cavity 37 and at such levels that when moved in opposite directions, will sever the tuft threads at a position above the bound portions of the group of threads, as clearly shown in Fig. 13. The forked die then moves inwardly as does also the plunger die and I preferably provide a stop block 87 which has portions above and below the forked die so that it will be impossible for the bound group of tuft threads to stick or adhere within the notch 65 of the forked die and during the latter part of the return movement of the forked die, the bound tuft threads will be released from the notch as is clearly obvious from the showing in Fig. 14, after which the operation is repeated; the head 36 being again raised and the movements again followed as above described.

The apparatus which I preferably employ for feeding the intermittent lengths of wire out of the tube 79, as clearly shown in Figs. 1 and 30, consists of a standard 88 to which is secured a rod 89; said rod having a lever 90 freely pivoted thereon and permitted to slide lengthwise thereof. The top portion of the lever 90 has a strip spring 91 which is bent downwardly at 92 and is provided with a clamping jaw 93. Another strip spring 94 has a looped part 95 which is secured to the lower part of the lever 90 and this strip spring 94 has an upwardly extending portion providing a jaw 96 which is opposed to the jaw 93 so that the wire 82 passes between the jaws 93 and 96 prior to entering the tube 79. The jaw 93 is adapted to slide on the upper surface of the spring 94 and both of the springs 91 and 94 are prevented from lateral movement by means of a guideway formed by strips 97 arranged at opposite sides of said springs. The rear end of the lever 90 is in engagement with a cam 98 on a shaft 99; said shaft being connected by a gear 100 with another gear 101 on the shaft 41. A coiled spring 102 is attached to the lever 90 preferably at a position directly above the rod 89 and this coiled spring is operative to move the lever 90 and springs 91 and 94 in a direction away from the wire tube 79.

A cam 103 on the shaft 41 is adapted to engage an extension 104 which projects laterally from the lever 90 and serves to move the lever and springs 91 and 94 in a direction toward the tube 79 against the action of the spring 102; said cam 98 having a surface of such width as to permit this bodily sliding movement without disengagement of the lever 90 with said cam 98; the cam 98 by swinging the lever 90 causes a relative sliding movement of the jaws 93 and 96 to resiliently grasp the wire 82 and the cam 103 moves the lever 90, springs 91 and 94 so that lengths of the wire will be intermittently fed through the tube 79. The plunger die receives its movement through the medium of a cam 105 on the shaft 99; said cam serving to engage an extension 106 on said plunger die and thereby effecting the forward movement of the plunger die as above described while a spring 107 attached to an arm 108 serves to retract said plunger die as is clearly obvious from the construction illustrated. The device 49 receives its movement from a cam 109 on the shaft 99; said cam 109 operating on a standard 110 as shown in Fig. 5; said standard being connected to a depending lug 111 which projects downwardly from the member 50 and a coil spring 112 serves to retract said device 49 by means of its connection with the lug 111 and with a fixed part 113 of the frame.

The forked die 63 receives its movement through the medium of a cam 114 on the main shaft 38 and a coiled spring 115 which is connected to an extension of the forked die and to a fixed part of the frame. The knives 85 and 86 are movable through the medium of arms 116 and 117 which are swung on their pivots 118 and 119 through the medium of cams 120 and 121 adjustably mounted on the shaft 41 by set screws 121ª or other suitable means; the retractive action of said knives being effected by a spring 122 which connects the rear ends of the arms 116 and 117. Thus as the knives become shortened by wear caused by sharpening, it is merely necessary, in order to compensate for this wear, to adjust the cams 120 and 121 on the shaft 41 by aid of the set screws.

The mandrel pin 80 is movable upward and downward by means of a lever 123 which is pivoted to a standard 124; said lever being adapted to be rocked by means of a cam 125 on the shaft 38; there being a coil spring 126 which is attached to an extension 127 of the lever and to a fixed part 128 of the frame.

Any suitable clutch mechanism 129 may be employed and controlled to operate the shaft 38 and I preferably employ a clutch structure so arranged that upon movement of a lever 130 or other suitable device that the various parts of the machine will receive a complete movement to form a tuft and apply the tuft to a loop and then automatically stop. The shaft 38 can be rotated by any suitable means and I have illustrated a pulley 131 which may be operated by a belt from any suitable source of power.

In the operation of my improved machine, considering that it is desired to make and apply tufts to loops of fringe or edgings such as the loops 84, the operator slips the first of the series of loops on the prong 66 when the parts are in the position shown in Fig. 6. The clutch 129 is then operated through the lever 130 which may be connected to a treadle (not illustrated) and the shaft 38 is caused to rotate. The parts operate as above described; the succession of movements being clearly illustrated in Figs. 6 to 14 inclusive and the result is that the tuft is formed as shown in Fig. 15 by a wrapping of wire around the tuft threads; said wire also passing through the loop 84 so as to connect the tuft to the loop; the loop and tuft being cast off, after which the next loop 34 in the series is placed upon the prong 66 and the operation again repeated and so on until all of the loops have received their tufts. By shaping the prongs 66 as shown at 70 and 66ª, the operator can easily and quickly place the loops on the prong 66 and the work can be carried on speedily and the resulting structure will be durable since the same wire which binds the strands or tuft threads also passes through the loops 84. Thus my machine not only is capable of quickly making the tufts but it simultaneously connects the tufts to the loops in a secure manner and so that the loops cannot pull out nor can the threads of the tuft readily pull out.

As previously stated, the post 35 is made hollow and in alinement with the cavity 37 so that in operation should there be any imperfect tufts formed or if for any reason the tufts would not be connected to the loops, said tufts when released can fall through the cavity 37 and hollow post 35 and can be received in any suitable receptacle placed under the top of the frame.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A machine of the character described including a head having prongs forming a notch; means for feeding tuft threads into said notch; and means for feeding a wire to embrace said tuft threads and to be bent by the inner wall of said notch around said tuft threads, one of said prongs having its outer surface concaved to permit finger room to allow a loop to be easily slipped over said prong so as to be bound by said wire to the tuft threads; substantially as described.

2. A machine of the character described including a head having prongs forming a notch; means for feeding tuft threads into said notch; and means for feeding a wire to embrace said tuft threads and to be bent by the inner wall of said notch around said tuft threads, one of said prongs tapering to a point whereby a loop can be easily slipped thereover so as to be bound by said wire to the tuft threads; substantially as described.

3. A machine of the character described including a head having prongs forming a notch; means for feeding tuft threads into said notch; and means for feeding a wire to embrace said tuft threads and to be bent by the inner wall of said notch around said tuft threads, one of said prongs tapering to a point and having its outer side surface concaved so as to permit a loop to be easily slipped thereover, the concaved surface serving to provide room and a guide for the movement of the finger of a person slipping the loop thereover; substantially as described.

4. A machine including a die providing prongs forming a notch, one of said prongs tapering to a point at its outer end to permit a loop to be easily slipped thereover, the inner wall forming said notch being grooved; means for feeding tuft threads into close proximity to said notch; means for bending a length of wire partway around said tuft threads and for forcing the ends of the wire into the grooved portion of said die, said grooved portion being shaped to deflect the ends of the wire to cause them to be wrapped around said tuft threads; substantially as described.

5. A machine including a die providing prongs forming a notch, one of said prongs tapering to a point at its outer end to permit a loop to be easily slipped thereover, the inner side walls of said notch flaring outwardly to provide an entrance for tuft threads, the wall forming said notch being grooved; means for feeding tuft threads into close proximity to said notch; and means for bending a length of wire partway around said tuft threads and for forcing the ends of the wire into said grooves of the notch whereby the wire will be compelled to take a path to cause it to be bent around said tuft threads to bind the same; substantially as described.

6. A machine including a die providing prongs forming a notch, one of said prongs tapering to a point at its outer end to permit a loop to be easily slipped thereover, the inner wall forming said notch being flared outwardly at its opposite sides and having grooves therein, said grooves at the innermost part of the notch following a substantially circular path and being positioned at different levels; means for feeding tuft threads in close proximity to said notch; and means for bending a length of wire partway around said tuft threads and for forcing the ends of the wire respectively into said notches to cause said wire to follow the paths of said notches and to wrap around said tuft threads; substantially as described.

7. A machine including a die providing prongs forming a notch, one of said prongs tapering to a point at its outer end to permit a loop to be easily slipped thereover, the inner wall forming said notch being flared outwardly at its opposite sides and having grooves therein, said grooves at the innermost part of the notch following a substantially circular path and being positioned at different levels; means for feeding tuft threads in close proximity to said notch; and means for bending a length of wire partway around said tuft threads and for forcing the ends of the wire respectively into said notches to cause said wire to follow the paths of said notches and to wrap around said tuft threads, said grooves at their outermost portions being widened to insure an entrance of the ends of the wire into the innermost portions of said grooves; substantially as described.

8. A machine including a notched die; means for feeding tuft threads in close proximity to the notch of said die; means for feeding a length of wire transversely to said tuft threads; means for bending said length of wire partway around said tuft threads so as to present the ends of the wire for abutment with the wall of said notch; and means for relatively moving said notched die and wire whereby the wall of said notch will complete the bending of said wire around the tuft threads, said die member providing a prong tapering to a point adjacent one side of the notch whereby a loop can be slipped thereover and so that an end of said wire will pass through said loop during the bending action of the wire whereby said loop will also be bound by said wire; substantially as described.

9. A machine including a notched die; means for feeding tuft threads in close proximity to the notch of said die; means for feeding a length of wire transversely to said tuft threads, the wall forming said notch having grooves formed therein; means for bending said length of wire partway around said tuft threads so as to present the ends of the wire for entrance into the outer portions of said grooves; and means for relatively moving said notched die and wire whereby the grooves of said notch will direct and bend the wire completely around said tuft threads, said die member being shaped to provide a prong tapering to a point at the side of said notch whereby a loop can be extended across one of said grooves so that the wire during its bending movement will pass through said loop and said loop will also be bound by said wire; substantially as described.

10. The method herein described of connecting a tuft to a loop which consist of bending a binding member around said tuft and including said loop between said binding member and the tuft whereby said binding member will be connected both to the tuft and to said loop.

11. A machine of the character described including a head having prongs forming a notch, said prongs having inner surfaces flaring outwardly to provide a wide mouth; means for feeding a length of wire transversely of said mouth; means for directing tuft threads into position between said mouth and the length of wire; means for bending said wire to cause its ends to engage said flaring surfaces of the prongs; and means for causing said ends of the wire to move relatively to said surfaces, whereby said surfaces will bend said wire partway around said tuft threads, and for causing said bent wire to engage the inner end of the notch whereby the inner end of the wire to complete will deflect the ends of the wire to complete the bending of the wire around the tuft threads; substantially as described.

12. A machine of the character described including a head providing a notch; a tuft feeding tube; means for relatively moving said head and tube whereby a portion of the tuft will be included in said notch; means effecting the bending of a wire around the portion of the tuft within said notch and for clamping said portion of the tuft; means for moving said head together with said portion of the tuft whereby the tuft will be moved through said tube; means for cutting said tuft between said two portions; and means for returning said head into a position to cause said second mentioned portion of the tuft to be positioned within said notch; substantially as described.

13. A machine of the character described comprising a head having prongs forming a notch including a groove, said prongs having inner surfaces flaring outwardly to provide a wide mouth, said surfaces including a comparatively wide extension of said groove; means for feeding a length of wire transversely of said mouth; means for directing tuft threads into position between said mouth and the length of wire; means for bending said wire to cause its ends to engage within the wide extensions of said groove; and means for causing said ends of the wire to move relatively to said prongs, whereby the grooved surfaces of said prongs will bend said wire partway around said tuft threads, and for causing said bent wire to engage the inner portions of said grooves in the notch whereby the inner portion of the notch will deflect the ends of the wire to complete the bending of the wire around the tuft threads; substantially as described.

14. A machine of the character described including a head having prongs forming a notch, one of said prongs having an inner surface curved outwardly and smoothly merging into the adjacent inner side surface of the notch, said prong having a concaved outer surface; means for directing tuft threads within said notch; and means for effecting the bending of a wire around said tuft threads within the notch; substantially as described.

15. A machine of the character described including a head having prongs forming a notch, one of said prongs having an inner surface curved outwardly and smoothly merging into the adjacent inner side surface of the notch, said prong having a concaved outer surface, the other end of said prong tapering in the direction of its height and width to a point which forms the junction of said inner and outer surfaces thereof; means for directing tuft threads within said notch; and means for effecting the complete bending of a wire around said tuft threads within the notch; substantially as described.

In testimony whereof I have signed my name to this specification in the presence of two subscribing witnesses.

CLARENCE F. ARNOLD.

Witnesses:
 Augustus B. Coppes,
 Chas. E. Potts.